United States Patent [19]

Wilburn

[11] Patent Number: 4,745,572

[45] Date of Patent: May 17, 1988

[54] SOFTWARE EDITING INSTRUMENT

[75] Inventor: Darrell L. Wilburn, Saratoga, Calif.

[73] Assignee: Step Engineering, Sunnyvale, Calif.

[21] Appl. No.: 794,632

[22] Filed: Nov. 4, 1985

[51] Int. Cl.[4] ............................................... G06F 1/00
[52] U.S. Cl. ................................................. 364/900
[58] Field of Search ... 364/200 MS File, 900 MS File, 364/130, 138

[56] References Cited

U.S. PATENT DOCUMENTS 4,573,115 2/1986 Halgrimson ........................ 364/138
4,602,324 7/1986 Fujawa et al. .................. 364/200 X Primary Examiner—Raulfe B. Zache
Attorney, Agent, or Firm—Thomas E. Schatzel

[57] ABSTRACT

A device for developing and editing a computer program in an electronic memory which is utilized to control a physical item having momentum. The device includes first and second program memories and means for exchanging one memory for the other without interrupting operative control of the physical item so that one of the program memories can be edited while the other is interactively controlling the physical item.

10 Claims, 1 Drawing Sheet

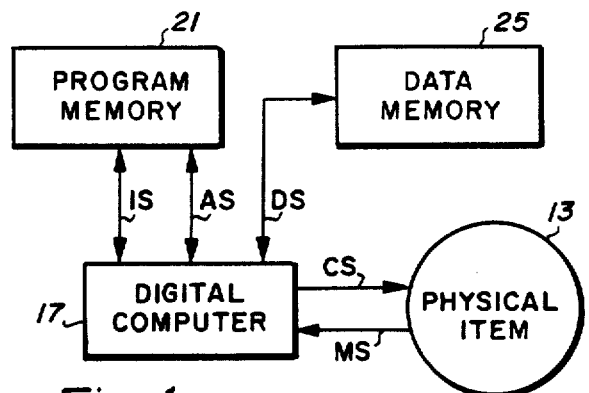
Fig_1
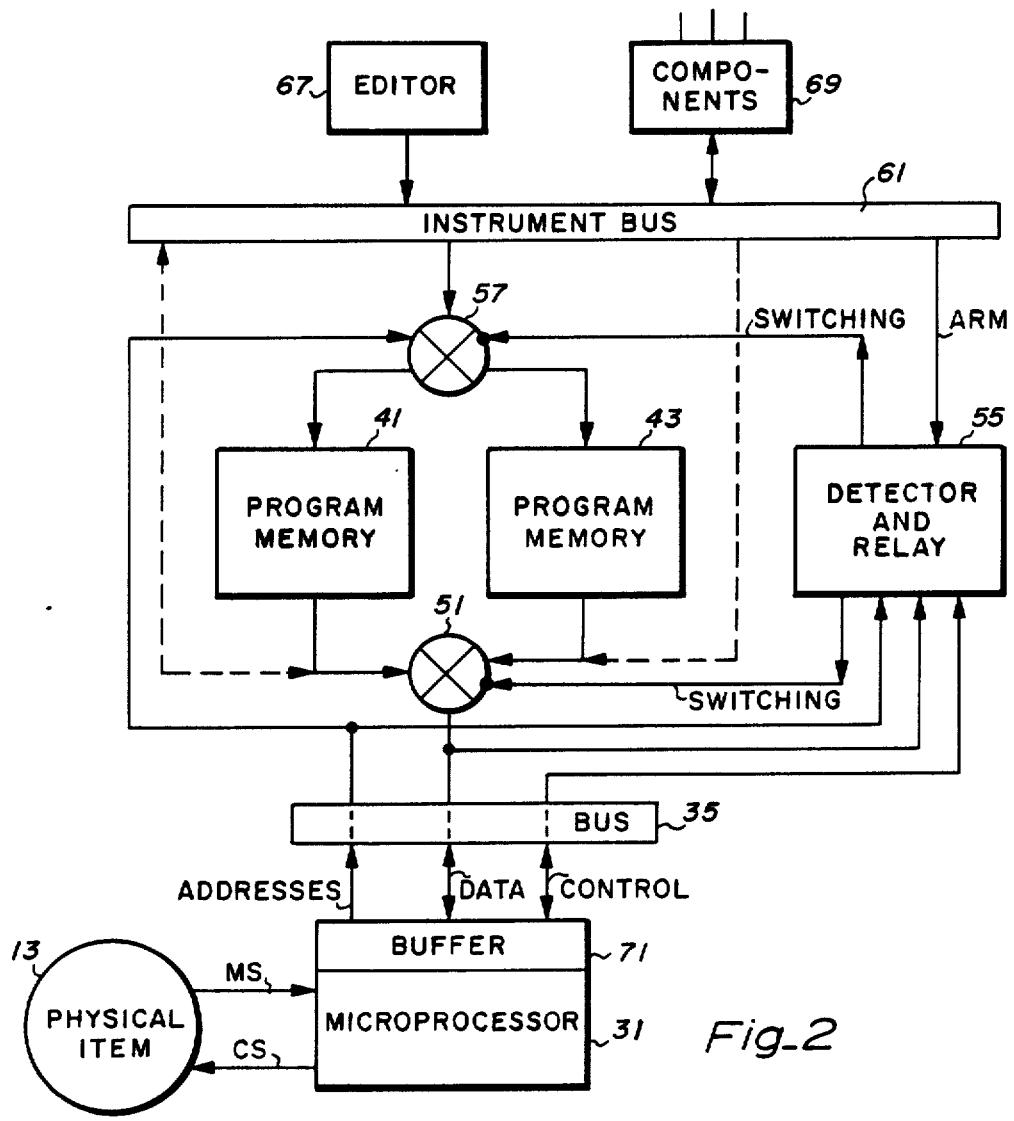
Fig_2

SOFTWARE EDITING INSTRUMENT

BACKGROUND OF THE INVENTION

1. Field of the Invention

The present invention relates to a development instrument for computer software and, more particularly, to a development instrument for use in conjunction with software utilized to interactively control physical items having momentum.

2. Description of the Prior Art

It is well known to provide microprocessor-based digital computers and associated software to control physical items having momentum. Examples of such controlled items include motors, engines, vehicles and other physical devices whose velocity of operation cannot be changed instantaneously. In typical systems for controlling such devices, various operating parameters of the controlled device are monitored so as to generate analog signals; the analog signals are translated to digital form by conventional analog-to-digital converters, and then operated upon by a microprocessor-based digital computer system. The usual object of the computer system in such instances is to optimize operation of the physical item in response to various monitored input parameters; for example, the object of an engine control system may be to optimize engine performance subject to monitored parameters reflecting fuel consumption, engine operating speed, oil temperature, water temperature and so forth. In order to accomplish such optimization and control, the microprocessor-based computer is operated by a software program which executes one or more algorithms, typically several, which operate upon the monitored parameters to generate control signals for the physical item.

In developing software programs for such applications, it is necessary and desirable to make various changes and additions, sometimes referred to as "patches", to the software program. The process of editing the software to implement such changes and additions is typically referred to as a development effort, and the means for making such additions and changes can be called a development system or software development instrument. In conventional software development systems, it is necessary to stop execution of the comuter program or otherwise operatively interrupt the control of the physical item during the time that changes or additions are being made to the software program. From a practical standpoint, this often requires that motion of the physical item be halted in order to prevent runaway conditions during the time that the control signals are interrupted. Such interruptions are not only time consuming, but can make it difficult to implement meaningful changes in the software program.

Generally speaking, workers in the programming art have avoided attempting to edit or otherwise modify software programs while the programs are controlling operation of physical items. Such modifications during operating periods are generally referred to as "real-time" modifications, and are avoided because, while making real time modifications, the real-time modifications may cause uncontrolled and unintended changes in the algorithms in the program, leading to loss of control over the physical item which is to be controlled or other unintended results. For example, when making a real-time modification or patch, the computer may operate upon a partial instruction or upon a partial patch, with unintended and unforeseeable results.

SUMMARY OF THE PRESENT INVENTION

A primary object of the present invention is to provide an instrument for editing a program in an electronic memory, which program includes an algorithm to control a physical item having momentum.

Another object of the present invention is to provide an instrument for editing a program in an electronic memory of a microprocessor, which program includes an algorithm to control a physical item having momentum, without interrupting operative control of the microprocessor or the physical item.

In accordance with the preceding objects, the present invention provides an instrument editing a program in an electronic memory which includes an algorithm for controlling a physical item having momentum while the physical item is interactively operating with a microprocessor acting to control the physical item comprising: a first program memory containing a first set of algorithms to interactively operate the microprocessor to control the physical item in response to monitored signals from the physical item; a second program memory containing a second set of algorithms to interactively operate with the microprocessor; a first switch interposed between the program memories and the microprocessor to allow only one of the program memories to interactively operate the microprocessor at a given time; and a detector means to recognize a preassigned address which is generated by the execution of an algorithm from the program memories and to actuate the first switch upon such recognition to replace the one of the program memories interactively operating said microprocessor with the other one of the program memories without interrupting operative control of the microprocessor and the physical item.

In view of the preceding, an advantage of the present invention is the provision of an instrument for editing a computer program in an electronic memory, which program includes an algorithm to control a physical item having momentum.

Another advantage of the present invention is the provision of an instrument for editing a program in an electronic memory of a microprocessor, which program includes an algorithm to control a physical item having momentum, without interrupting operative control of the microprocessor or the physical item.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a functional block diagram of a conventional computer control system for a physical item having momentum; and FIG. 2 is a functional block diagram of a software development instrument according to the present invention.

DETAILED DESCRIPTION OF THE PREFERRED EMBODIMENT

FIG. 1 illustrates a conventional microprocessor-based computer system for interactively controlling a physical item 13 having momentum. Examples of physical items which are controlled can include electric motors, engines such as are utilized in automobiles and airplanes, and other mechanical devices. As shown in FIG. 1, monitored signals MS representing monitored physical parameters are provided from the physical item 13 to a digital computer 17 which, in response, provides control signals CS to the physical item 13. Typically, the monitored signals are generated by transducers connected to the physical item and are analog in form. Examples of such monitored signals MS would be, in the instance of an automobile engine, parameters such as fuel flow, oil temperature, oil pressure, rotational speed and so forth. Prior to being operated upon by the digital computer 17, analog monitored signals are converted to digital form by a conventional analog-to-digital converter (not shown). The digital computer 17 functions to execute various predetermined algorithms utilizing the monitored signals as exogenous parameters, thus to provide digital control signals which, in turn, can be converted to analog form as signals CS and provided to control the physical item. The signals CS are normally provided to a controller device, not shown, associated with the physical item. Examples of signals CS would be signals to control the throttle setting and spark advance of the engine. Examples of controller devices associated with the physical item 13 would be a throttle controller or a spark advance device.

Further in FIG. 1, the microprocessor-based digital computer 17 is shown as receiving and sending instructional signals IS and address signals AS to a program memory 21. Also, the digital computer communicates data signals DS back and forth to a data memory 25. The program memory 21 can be understood to store sets of algorithms to control various components of the microprocessor-based digital computer 17 as well as algorithms to execute upon the monitored signals as exogenous variables to provide the control signals CS to the physical item 13 via the computer 17.

FIG. 2 illustrates a software development instrument according to the present invention whose purpose, generally speaking, is to allow modification or editing of a program memory while a physical item 13 having momentum is continuously and interactively controlled by a microprocessor 31 with which the program memory is associated.

In the software development instrument of FIG. 2, the microprocessor 31 is connected to provide control signals CS to the physical item 13 and to receive monitored signals MS from the physical item. The control signals CS and the monitored signals MS of the system of FIG. 2 can be understood to be essentially the same as the corresponding signals in the system of FIG. 1. Thus, the software development instrument of FIG. 2 can be said to provide real-time data acquisition. The microprocessor 31 of FIG. 2 should be understood to include a conventional data memory, not shown, which stores the monitored signals MS from the physical item 13. As in the system of FIG. 1, the physical item 13 can be understood to include a conventional controller, not shown, which typically includes a microprocessor to operate upon the digital or analog control signals from the microprocessor 31 to provide actual physical control of the physical item.

Further in the software development instrument of FIG. 2, the microprocessor 31 is connected to a bus 35 to provide and receive digital address, data, and CONTROL signals from the bus. Generally speaking, the CONTROL signals are synchronizing signals such as commands to latch instruction registers, commands to enable ROM's (read only memories), clocking signals and the like. Likewise, the data signals and address signals are binary signals such as conventionally utilized in digitial microprocessors.

The software development instrument of FIG. 2 further includes a first program memory 41 such as a random access memory (RAM) or other conventional program memory storage device. The software development instrument also includes a second program memory 43 which is essentially similar to the first program memory 41. In practice, it is preferred that the first and second program memories 41 and 43 each comprise RAMs such as are sometimes called dual port RAMs, having a storage capacity of about 128,000 bytes. Both the first and second program memories 41 and 43 are connected to transfer digital data signals back and forth to the microprocessor 31 via a first switch 51 and the bus 35. In an alternative embodiment, for example, the first and second program memories 41 and 43 are not totally separate devices but are separate segments of a third program memory which includes both the first and second program memories, in whole or in part.

In addition, the software development instrument of FIG. 2 includes a detector-and-relay circuitry 55 connected to receive the CONTROL signals, data signals, and address signals from the bus 35. The detector-and-relay 55 provides first switching signals to operate the first switch 51 and, simultaneously, second switching signals to operate a second switch 57. (The name detector-and-relay is given to the component 55 to designate its function of both detecting signals and, in response, providing output control signals; accordingly, component 55 is not a conventional electromechanical relay.) The second switch 57 is interposed between an instrument bus 61 and the first and second program memories 41 and 43. The second switch 57 further receives address signals from the first bus 35.

As also shown in FIG. 2, the instrument bus 61 is connected to provide ARM signals to the detector and relay 55. The instrument bus 61 is also connected to receive address, data and control signals from an editor 67 as well as components 69. In practice, the buses 35 and 61 are parallel buses which transfer address, data, and control signals in bit-parallel, byte-serial manner. The editor 67 is a conventional machine, typically a microprocessor, which can implement changes in a program memory such as a RAM. The components 69 can be devices such as CRT display screens, printers, imagers, digital computers, and so forth which operate upon or generate binary signals useful with the software development instrument.

The first switch 51, as mentioned previously, is the means to operatively associate either the first program memory 41 or the second program memory 43 with the microprocessor 31. When one of the program memories is interactively operating with the microprocessor 31, the microprocessor operates exclusive of the other program memory. Stated somewhat differently, either program memory 41 is operatively associated with the microprocessor 31 or the memory 43 is operatively associated with the microprocessor 31, but not both memories. During the period that a program memory is operatively associated with the microprocessor 31, the memory can be described as being the executing memory. When a program memory is not operatively associated with the microprocessor, the memory can be said to be in the edit mode.

In practice, the first switch 51 and the second switch 57 are implemented by conventional high speed latches or other digital electronic devices such as multiplexers. Operation of the first switch and second switches 51 and 57 are controlled by digital signals developed by the detector-and-relay 55. In actual operation, it is essential that the switches 51 and 57 operate rapidly relative to the execution switching speeds of the program memories. That is, the switches 51 and 57 must have switching times that are substantially faster than the access time of any digital electronic memory element associated with the physical item 13. By providing such relatively rapid switching times, the software development system can operate without imposing so-called wait state time burdens the control of the physical item and without imposing special instructions in the program flow to accommodate the software development instrumentation, both of which would affect the real-time control of the physical item. In the preferred embodiment, the switching time is about ten to twenty nanoseconds.

The second switch means 57 is similar to the first switch means 51 in that it functions to selectively isolate one of the program memories from receiving certain digital signals. Likewise, the second switch means is implemented by conventional latches or other digital electronic devices.

During the period that a program memory is isolated in the edit mode, so that it is effectively blocked from communicating with the microprocessor by the first switch 51, that program memory is nevertheless in communication with the instrument bus 61 via the second switch 57 to receive editing commands from editor 67. Thus, during the period that one of the program memories is interactively executing with the microprocessor 31, the other program memory can be edited. During such times, the second switch 57 prevents the executing memory from receiving edit signals from the instrument bus 61. The editing or patching process allows a user of the software development instrument to introduce any desired changes into the algorithms in the program memory being edited without affecting the executing program memory.

During times when one of the program memories is being edited, the executing program memory is also sending and receiving binary signals from the instrument bus 61 via the second switch 57. Such signals permit, for example, the previously mentioned display and other panel functions 69 to be provided.

The ARM signal is the signal which instructs the detector-and-relay 55 to generate the first and second switching signals coincident the detector-and-relay recognizing the preassigned address during execution of the algorithm loops by the executing memory. In other words, generation of the preselected address by the executing memory will trigger the detector and relay device 55 after that device has received an ARM signal. In practice, the ARM signals are generated by the editor 67 at the discretion of the user of the software development instrument.

The detector and relay 55 functions to recognize preassigned addresses which are generated during execution of an algorithm by the one of the program memories 41 and 43 operating in the execute mode. Ordinarily, the preassigned addresses are determined by a user of the software development instrument and are chosen as addresses which uniquely designate the beginning or end of major program segments in the algorithms stored in the first and second program memories. The term preassigned addresses as utilized herein, should be broadly interpreted to include, for example, data states, read/write states and other logic states; thus, the term encompasses so-called system state match words. Upon recognition of such preassigned addresses, the detector and relay 55 functions to generate the first and second switching signals which, in turn, actuate the first switch 51 and the second switch 57. When the first and second switches 51 and 57 are actuated, the executing program memory is replaced by with the edited program memory without interrupting operative control of the microprocessor 31.

As also shown in FIG. 2, a buffer 71 can be interposed between the microprocessor 31 and the bus 35. The buffer 71 is a conventional component whose function is to permit data to be stored momentarily before such data is conveyed to the program memory 41 or 43 via the first switch 51. In practice, the buffer 71 operates to impose a maximum delay of about fifty nanoseconds.

In view of the preceding description, operation of the software development instrument of the present invention can be readily understood. Normally, the algorithms in the first and second program memories will, at some initial time, be identical. (Typically, the initial content of the program memories 41 and 43 will be provided by downloading a program from another digital computer controlled by the user of the software development instrument.) Thus, editing of the non-executing memory is functionally equivalent to editing the executing program memory without affecting the control function of the executing memory at the time the editorial changes are implemented. After the non-executing program memory is edited to the user's satisfaction, the user of the software development instrument will direct that an ARM signal be conveyed to the detector-and-relay 55, and the user will designate an address at which the detector-and-relay 55 should generate the first and second switching signals. Then, when the executing program memory generates the preassigned address during execution of an algorithm, the detector-and-relay 55 will provide the switching signals to simultaneously actuate the first and second switches 51 and 57. Upon actuation of the switches 51 and 57, the former executing memory will be placed in the edit mode and the edited memory will become the executing memory. Because the switching between the two memories is rapid relative to the instruction execution time of the memories, such interchange of the memories can be accomplished without interruption of the interactive control provided by the microprocessor 31, without imposing wait state time burdens on the control of the physical item and without otherwise requiring changes on the software associated with the controller of hte physical item. If the performance of the algorithms in the edited memory are satisfactory to the user of the software development instrument, the same editorial changes can be introduced into the formerly executing program. Otherwise, the two program memories can be re-interchanged.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An instrument for assisting an editor in editing a program in an electronic memory which includes an algorithm for controlling a physical item having momentum while the physical item is interactively operating with a microprocessor acting to control the physical item comprising:
    a. a first program memory, connected to the microprocessor, containing a first set of algorithms to interactively operate the microprocessor which, in turn, controls operation of said physical item in response to monitored signals from said physical item;
    b. a second program memory, connected to the microprocessor, containing a second set of algorithms to interactively operate with the microprocesor;
    c. a first switch connected between the first program memory and the second program memory and the microprocessor to allow one of either the first program memory or the second program memory to interactively operate the microprocessor at a given time; and
    d. detector means, connected to the first switch, which recognizes a preassigned address which is generated during execution of an algorithm in either the first program memory or the second program memory, the detector means functioning to actuate the first switch upon recognition of the preassigned address so that if the first program memory is interactively operating said microprocessor, it will be replaced with the second program memory without interrupting operative control of the microprocessor and the physical item, and if the second program memory is interactively operating said microprocessor, it will be replaced with the first program memory without interrupting operative control of the microprocessor and the physical item.

2. An instrument for assisting in editing a computer program according to claim 1 wherein,
    the first program memory and the second program memory are both random access memories.

3. An instrument for assisting in editing a computer program according to claim 1 wherein,
    said first program memory and said second program memory are segments of a third memory means which includes both said first program memory and said second program memory.

4. An instrument according to claim 3 wherein,
    said third program memory is a random access memory.

5. An instrument according to claim 1 further including,
    a second switch connected between the first program memory and the second program memory and an editing device connected to said second switch to permit the editing device to communicate with the first program memory if the second program memory is interactively operating with the microprocessor, while simultaneously preventing said editing device from communicating with the second program memory, and to permit the editing device to communicate with the second program memory if the first program memory is interactively operating the microprocessor, while simultaneously preventing said editing device from communicating with the first program memory.

6. An instrument according to claim 5 wherein,
    said detector means is connected to actuate the second switch simultaneoully with actuation of the first switch.

7. A method for developing software for programming operation of a microprocessor which interactively controls a physicasl item having momentum comprising:
    a. providing a first program memory to provide algorithms to interactively operate said microprocessor;
    b. providing a second program memory to provide algorithms to interactively operate said microprocessor;
    c. providing a first switch means connected between said first program memory and said second program memory and said microprocessor to allow one of either said first program memory or said second program memory to interactively operate with said microprocessor at a given time;
    d. providing means to recognize a preassigned address which is generated during execution of an algorithm by one of either the first program memory or the second program memory which is interactively operating said microprocessor;
    e. editing the algorithm in one of either the first program memory or the second program memory which is not interacting with said microprocessor until such time as the preassigned address is generated by either the first program memory or the second program memory which is interacting with said microprocessor; and
    f. without interrupting operative control of said microprocessor or imposing a wait state pause, actuating said first switch means upon recognition of said preassigned address to replace one of either the first program memory or the second program memory which is interactively operating said microprocessor with either the first program memory or the second program memory which is not interactively operating said microprocessor.

8. A method according to claim 7 wherein,
    said preassigned address is located at an end portion of a program segment executed by the algorithms stored by either the first program memory or the second program memory which is interactively operating said microprocessor.

9. A method according to claim 7 including the step of buffering a flow of data from said microprocessor to either the first program memory or the second program memory whichever is interacting with said microprocessor at that given time.

10. A method according to claim 7 further including the step of providing display means and digital computer means to interactively operate with said microprocessor and, further, providing second switch means to selectively connect the display means and digital computer means to either the first program memory or the second program memory which is interactively operating said microprocessor.

* * * * *